United States Patent [19]

Frickenhaus et al.

[11] 3,790,344

[45] Feb. 5, 1974

[54] AGENTS FOR IMPROVING THE FASTNESS TO WET PROCESSING

[75] Inventors: Gerritt Frickenhaus, Wuppertal-Ronsdorf; Martin Meister, Leverkusen; Hellmuth Pantke, Leichlingen; Erhard Schuffenhauer, Cologne, all of Germany

[73] Assignee: Farbenfabriken Bayer Aktiegesellschaft, Leverkusen, Germany

[22] Filed: Nov. 30, 1970

[21] Appl. No.: 93,812

[30] Foreign Application Priority Data

Dec. 3, 1969 Germany............................ 1960616

[52] U.S. Cl................................ 8/165, 8/93, 8/173
[51] Int. Cl............................................. D06p 5/02
[58] Field of Search ........ 8/173, 89, 178 R, 74, 165

[56] References Cited

UNITED STATES PATENTS

| | | | |
|---|---|---|---|
| 3,663,157 | 5/1972 | Gilglen et al. ............................. | 8/65 |
| 3,290,111 | 12/1966 | Hees ..................................... | 8/89 X |
| 2,220,129 | 11/1940 | DuPont................................... | 8/74 |
| 3,065,039 | 11/1962 | Komarek .......................... | 8/94.24 X |
| 3,075,822 | 1/1963 | Akel ......................................... | 8/89 |

FOREIGN PATENTS OR APPLICATIONS

| | | | |
|---|---|---|---|
| 759,595 | 12/1953 | Great Britain.......................... | 8/178 |

OTHER PUBLICATIONS

Textile Chemist & Colonist, Sept. 1969, Products/70 page 293 vol. 1, No. 20A, J. of Amer. Assoc. of Tex. Chem. & Col.

Trotman, Dyeing & Chemical Tech. of Textile Fibres, page 554 and 555, 4th edit. Jan. 1970.

Primary Examiner—Donald Levy
Attorney, Agent, or Firm—Plumley & Tyner

[57] ABSTRACT

Process for improving the fastness to wet processing of dyeings obtained on synethetic polyamides with anionic and/or cationic dyestuffs wherein the dyeings are aftertreated with aqueous liquors containing condensation products of a higher molecular weight prepared from (a) 4,4'-dioxydiphenyl-sulphon, (b) formaldehyde and (c) phenol sulphonic acid, naphthalene sulphonic acid, sodium sulfite or sodium hydrogen sulfite, using the components (a), (b) and (c) in a molecular ratio of 1:0.7–1.1:0.7–0.2.

18 Claims, No Drawings

AGENTS FOR IMPROVING THE FASTNESS TO WET PROCESSING

The present invention relates to a process for improving the fastness to wet processing of dyeings obtained on textile materials of synthetic polyamides; more particularly it concerns a process for improving the fastness to wet processing of dyeings obtain in synthetic polyamides with anionic and/or cationic dyestuffs wherein the dyeings are aftertreated with aqueous liquors containing condensation products of a higher molecular weight prepared from (a) 4,4'-dioxydiphenyl-sulphon, (b) formaldehyde and (c) phenol sulphonic acid, naphthalene sulphonic acid, sodium sulfite or sodium hydrogen sulfite, using the components (a), (b) and (c) in a molecular ratio of 1:0.7–1.1:0.7–0.2, preferably 1:0.7–1.1:0.5–0.25.

The invention relates furthermore to agents for improving the fastness to wet processing of dyeings obtained on textile materials of synthetic polyamides with anionic and/or cationic dyestuffs. The agents are characterised by a content of condensation products of a higher molecular weight prepared from (a) 4,4'-dioxydiphenyl-sulphone, (b) formaldehyde and (c) phenol-sulphonic acid, naphthalene sulphonic acid, sodium sulfite or sodium hydrogen sulfite, using the components (a), (b) and (c) in a molecular ratio of 1:0.7–1.1:0.7–0.2, preferably 1:0.7–1.1:0.5–0.25.

The condensation products to be used according to the invention can be applied as free acids or in the form of their alkali salts or ammonium salts.

As alkali salts the sodium and potassium salts may especially be mentioned and as ammonium salts the ammonium, methyl ammonium, cyclohexyl ammonium, monoethanol ammonium, diethanol ammonium, and triethanol ammonium salts may especially be mentioned.

The condensation products to be used according to the invention can be prepared, e.g., by condensing 4,4'-dihydroxydiphenyl-sulphon, formaldehyde and sulphonic acid in an acid or alkaline medium at temperatures of 100°–120° C preferably at the boiling temperature of the mixtures. If necessary the condensation products may be subsequently precipitated by neutralizing respectively acidifying the reaction mixtures. The reacton of dihydroxydiphenyl-sulphon, formaldehyde and sodium hydrogen sulfite is carried out advantageously by reacting the condensation product obtained by condensing in an alkaline solution dihydroxydiphenyl-sulphon and formaldehyde, with sodium hydrogen sulfite, respectively advantageously with sodium-pyrosulfite at temperatures of 90°–120° C and precipitating the higher molecular weight condensation products by acidifying the reaction solution.

The quantities in which the condensation products according to the invention are employed in the after-treatment liquors, can vary within wide limits; in general, an addition of 0.5 – 5 percent by weight, relative to the weight of the goods being dyed, has proved successful.

The after-treatment, with the condensation products according to the invention, of the dyeings produced on the textile materials of synthetic polyamides with anionic and/or cationic dyestuffs, can be carried out either by the padding process or by the exhaustion process.

In the after-treatment by the padding process, the dyed textile materials are padded with the liquors which contain the condensation products according to the invention, squeezed out to a weight increase of 70 – 140 percent, preferably 80 – 100 percent, dried at temperatures of 60°–100° C, preferably 80°C, and subsequently optionally subjected to a dry heat treatment at 180° – 185° C.

In the after-treatment by the exhaustion process, the dyed textile materials are introduced into the aqueous liquor, containing condensation products according to the invention, using a liquor ratio of 1 : 10 – 1 : 50, and agitated therein for a certain time, about 10 – 60 minutes, at slightly elevated temperature, about 30° – 100° C, preferably 40° – 70° C. Thereafter, the textile materials are rinsed and dried.

It has frequently proved of value, both in the after-treatment by the padding process and in the after-treatment by the exhaustion process, if the after-treatment liquors contain, additionally to the condensation products to be used according to the invention, also electrolytes, for example, alkali salts, alkaline earth salts or heavy metal salts of inorganic or organic acids, such as sodium sulphate, potassium chloride, cadmium nitrate, zinc chloride and especially magnesium sulphate and zinc acetate. This addition of electrolyte especially improves the fastness-improving action of the condensation products to be used according to the invention in thermofixing.

The condensation products to be used according to the invention are suitable both for the after-treatment of dyeings which have been produced with anionic dyestuffs, for example with azo, anthraquinone, triphenylmethane, azine, xanthene or nitro dyestuffs, especially with the so-called acid wool dyestuffs of the azo and anthraquinone series, and for dyeings which have been obtained with cationic dyestuffs, for example with diphenylmethane, triphenylmethane, rhodamine, thiazine, oxazine, methine and azomethine dyestuffs, and also with anthraquinone and azo dyestuffs having a basic or quaternised amino group.

As synthetic polyamides which can be dyed with anionic dyestuffs, polyhexamethylenediamine adipate, poly-ε-caprolactam and poly-ω-aminoundecanoic acid may especially be mentioned, and as synthetic polyamides which can be dyed with cationic dyestuffs the corresponding anionically modified polyamides may especially be mentioned.

It is already known to use tanning agents, e.g., condensation products of dioxydiphenyl-sulphon, formaldehyde and aromatic sulfonic acids as agents for improving the fastness to wet processing of dyeings obtained on textile materials of synthetic polyamides with anionic dyestuffs. The condensation products to be used according to the invention are distinguished over these known water-soluble condensation products that in their preparation dioxydiphenyl-sulphon and SO₃H-group containing compound are used in such molecular ratios that barely water-soluble condensation products are obtained which do not dissolve in larger amounts of water respectively dissolve very slowly only to a small degree. The condensation products to be used according to the invention which could not be used in practice as tanning agents dissolve in water only with heating and form no clear but opalescent solutions.

Furthermore it is known that condensation products of diphenyl ether sulphonic acid and formaldehyde which have been used in the leather treatment can be applied for improving the fastness to wet processing of dyeings obtained on textile materials of synthetic polyamides with cationic dyestuffs.

The condensation products to be used according to the invention are distinguished over the tanning agents which are used until now as agents for improving the fastness to wet processing that they improve the fastness to wet processing of dyes obtained with anionic as well as with cationic dyestuffs, furthermore that their effectiveness in improving the fastness to wet processing is not affected by thermofixing as is the effectiveness of tanning agents based on dioxydiphenylsulphonformaldehyde-aromatic-sulphonic-acid-condensation products and that the effectiveness in improving the fastness to wet processing can be enhanced by the addition of electrolytes.

Furthermore they do not exhibit the disadvantage of the known tanning agents used as agents for improving the fastness to wet processing, to detach partially the cationic dyestuffs fixed on the fibre during the after-treatment. Therefore the after-treatment with the condensation products to be used according to the invention does not cause a decrease of colour strength and deterioration of the fastness to rubbing of the dyeings obtained with the cationic dyestuffs and dulling of the dyeings obtained with the anionic dyestuffs. It was surprising that by a change in the molecular ratio of the starting materials there were obtained condensation products which are essentially superior in their properties to all agents used until now for improving the fastness to wet processing.

The parts given in the following examples are parts by weight; the dyestuff numbers refer to the data given in Colour Index, Vol. 3, 2nd edition, 1956.

Example 1

A fabric of polyhexamethylenediamine adipate filaments which has been dyed with 4 percent referred to the dry-weight of the fabric of the anionic dyestuff No. 62,020 is agitated for 30 minutes in a goods-to-liquor ratio of 1:30 in a bath warmed to 60° C which contains per litre 0.35 g of the condensation product A described below and is adjusted to a pH-value of 4.5 with acetic acid; thereafter the fabric is rinsed with water and dried. After the treatment the dyeing shows the following values of fastness to wet processing (determined by assessing the bleeding into normal white ε-caprolactam according to DIN 54002):

fastness to water b (determined according to DIN 54-006):5 fastness to perspiration, acid (determined according to DIN 54020):5 fastness to perspiration, alkaline (determined according to DIN 54020): 5

The condensation product A used was manufactured as follows: The mixture of 134 g of phenolsulphonic acid (0.5 mole), 100 ml of water, 500 g of 4,4'-dihydroxydiphenylsulphon (2 mole) and about 60 ml of 44 percent strength aqueous sodium hydroxide solution was mixed with 160 ml of 30 percent strength formaldehyde solution and then heated on the boiling water bath for 30 minutes whilst stirring. There was formed a clear solution which was subsequently heated under reflux for 24 hours. The reaction solution was then diluted with 300 ml of water and mixed with half concentrated hydrochloric acid at 90° C until no further precipitation occurred and the aqueous phase was acid to congo paper. The precipitated resin was pressed out, pulverized and dried. Yield: 575 g An equivalent improvement of the fastness to wet processing was also achieved if there was used instead of the condensation product A the same amount of one of the condensation products B or C described below.

Condensation product B:

This was manufactured in the same way as product A with the only change that a mixture of 134 g of phenolsulphonic acid (0.5 mole), 50 ml of water, 250 g of 4,4'-dihydroxydiphenylsulphon (1 mole), 45 ml of 44 percent strength aqueous sodium hydroxide solution and 90 ml of 30 percent strength formaldehyde solution was condensed.

Condensation product C:

This was manufactured in the same way as product A with the only change that a mixture of 90 g of phenolsulphonic acid (0.34 mole), 50 ml of water, 250 g of 4,4'-dihydroxydiphenylsulphon (1 mole), 35 ml of 44 percent strength aqueous sodium hydroxide solution and 85 ml of 30 percent strength formaldehyde solution was condensed.

Example 2

Filaments of anionically modified polyamide which has been dyed 0,75 % by weight of the cationic dyestuff I

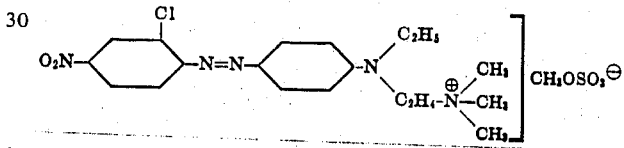

are agitated for 30 minutes in a goods-to-liquor ratio of 1:30 in a bath warmed to 60° C which contains per litre 0.35 g of the condensation product described below and has a pH-value of 4.5; subsequently the filaments are rinsed with water and dried. After the treatment the dyeing shows the following values of fastness to wet processing (determined by assessing the bleeding into normal white ε-caprolactam according to DIN 54002):

fastness to water b (determined according to DIN 54006): 4 – 5 fastness to perspiration, acid (determined according to DIN 54020):4 fastness to perspiration, alkaline (determined according to DIN 54020):4 – 5

The condensation product used was manufactured as follows: 100 ml of water, 250 g of 4,4'-dihydroxydiphenylsulphon (1 mole) and 95 ml of 30 percent strength formaldehyde solution were added to 65 g of the naphthalene sulphonation product described below at a temperature below 110° C. The reaction mixture was heated at first for 30 minutes on the boiling water bath, then to reflux. After about 1 hour a clear solution was formed from which on further heating a precipitate separated. The boiling under reflux was continued until an odor of formaldehyde was no longer detectable (about 20 hours). 50 ml of hot water were then added to the reaction mixture. The supernatant liquor was decanted and the remaining resin was pressed out while still warm and dried. Yield: 325 g The naphthalene sulphonation product used was prepared by heating for several hours equal parts of naphthalene and sulphuric acid to 160° C. 260 g of the melt such obtained correspond to about 1 mole naphthalene sulphonic acid.

Example 3

A knitted fabric of polyhexamethylenediamine adipate filaments and anionically modified polyhexamethylenediamine adipate filaments, which has been dyed in a single bath with 0.75 percent by weight of the anionic dyestuff No. 13,425 and 0.75 percent by weight of the cationic dyestuff described in Example 2 is agitated for 30 minutes in a goods-to-liquor ratio of 1:30, in a bath warmed to 60° C, which per litre contains 0.5 g of the condensation products described below and is adjusted to a pH-value of 4.5; thereafter the fabric is rinsed with water and dried.

After the treatment, the dyeing shows the following values of fastness to wet processing (determined by assessing the bleeding into normal white ε-polycaprolactam according to DIN 54,002):

|  | Dyeing obtained with | |
|---|---|---|
|  | anionic dyestuff | cationic |
| fastness to water, b(determined according to DIN 54,006 | 4 – 5 | 5 |
| fastness to perspiration, acid (determined according to DIN 54,020): | 4 – 5 | 4 – 5 |
| fastness to perspiration, alkaline (determined according to DIN 54,020): | 4 | 4 |

The condensation product used was manufactured as follows: 250 g of 4,4'-dihydroxydiphenylsulphon were dissolved with heating in the solution of 40 g of sodium hydroxide in 400 ml of water. The solution such obtained was mixed with 90 ml of 30 percent strength formaldehyde solution, heated to reflux and kept at this temperature for 14 hours. After cooling the reaction solution was mixed with 48 g of sodium pyrosulfite; the precipitation which formed dissolved on heating the mixture to reflux temperature. After a 12 hours' heating at this temperature the reaction mixture was diluted with an equal amount of hot water and acidified at 70° C with 200 ml of hydro chloric acid until the supernatant liquor was weak mineral acid. The precipitated resin was pressed out mechanically while still hot. Yield(dried product): 266 g Example 4

A knitted fabric of polyhexamethylenediamine adipate filaments and anionically modified polyhexamethylenediamine adipate filaments, which has been dyed in a single bath with 2 percent by weight of the anionic dyestuff No. 62,020 and 0.75 percent by weight of the cationic dyestuff described in Example 2 is aftertreated in the same way as is described in Example 3 in a bath which contains per litre 0.6 g of one of the condensation products A, B and C described in Example 1.

After the treatment, the dyeing shows the following values of fastness to wet processing (determined by assessing the bleeding into normal white ε-polycaprolactam according to DIN 54,002):

|  | Dyeing obtained with | |
|---|---|---|
|  | anionic dyestuff | cationic |
| fastness to water, b(determined according to DIN 54,006 | 5 | 5 |
| fastness to perspiration, acid (determined according to DIN 54,020): | 5 | 4 – 5 |
| fastness to perspiration, alkaline (determined according to DIN 54,020): | 5 | 5 |

Example 5

A fabric of polyhexamethylenediamine adipate filaments which has been dyed with 4 percent by weight of the anionic dyestuff No. 62,020 is impregnated on a padder with an after-treatment liquor which per litre contains 50 g of one of the condensation products described in example 1, 2 and 3 and 5 g of sodium sulphate, squeezed out to a weight increase of 80 percent, then dried for 20 seconds at 80° C and subsequently heat-fixed for 20 seconds at 195° C.

As a result of this after-treatment the fastness properties to wet processing of the dyeing are improved to the values given in examples 1, 2, 3 and 4.

Example 6

Piece goods of polyhexamethylenediamine adipate which have been dyed with 4 percent by weight of the anionic dyestuff No. 62,020 are continuously treated on the roller box at 60° C with a bath which contains per litre 30 g of one of the condensation products described in Example 1, 2 and 3 and which is adjusted to a pH-value of 4.5 with acetic acid. The concentration of the condensation product and acetic acid is maintained constant by addition of these products during the passage time of the piece goods which are subsequently rinsed with water and dried.

As a result of this after-treatment, the fastness to wet processing of the dyeing is improved to the values given in Examples 1, 2, 3, and 4.

We claim:

1. In the process for improving the wet processing fastness of dyeings on synthetic polyamides with anionic dyestuffs, cationic dyestuffs and mixtures thereof in which the dyeings are after-treated with aqueous liquors containing a formaldehyde condensation product the improvement which comprises using as the formaldehyde condensation product an alkali catalyzed condensation product of higher molecular weight prepared from (a) 4,4'-dihydroxy-diphenyl-sulfone, (b) formaldehyde and (c) phenol sulfonic acid or naphthalene sulfonic acid, using the components (a), (b) and (c) in a molecular ratio of 1:0.7–1.1:0.7–0.2.

2. The process of claim 1 in which said condensation product of higher molecular weight comprises components (a), (b) and (c) in a molecular ratio of 1:0.7–1.1:0.5–0.25.

3. The process of claim 2 in which component (c) is phenol sulfonic acid.

4. The process of claim 1 in which the aqueous liquors for after-treatment contain electrolyte in addition to said condensation products.

5. The process of claim 4 in which said electrolyte is an alkali metal, an alkaline earth metal or a heavy metal salt of an organic acid.

6. The process of claim 4 in which said electrolyte is a sodium or potassium chloride or cadmium, zinc or magnesium salt of hydrochloric, sulfuric or acetic acid.

7. The process of claim 4 in which magnesium sulfate or zinc acetate is used as said electrolyte.

8. The process of claim 1 in which said condensation product of higher molecular weight is soluble in water only with heating and forms an opalescent solution.

9. The process of claim 1 in which the amount of said condensation product of higher molecular weight in the treating liquor is 0.5–5 per cent by weight of the synthetic polyamide material and in which the treating liquor is applied to increase the weight the synthetic polyamide by 70–140 percent.

10. Synthetic polyamide textile material having good wet processing fastness comprising polyamide textile material dyed with anionic dyestuff, cationic dyestuff or mixture thereof and after treated by applying, in an aqueous liquor, an effective amount of a formaldehyde condensation product to increase the degree of wet processing fastness; said formaldehyde condensation product comprising an alkali catalyzed condensation product of higher molecular weight prepared from (a) 4,4'-dioxydiphenyl-sulfone, (b) formaldehyde and (c) phenol sulfonic acid or naphthalene sulfonic acid, using the components (a), (b) and (c) in a molecular ratio of 1:0.7–1.1:0.7–0.2; and drying the treated synthetic polyamide textile material.

11. The treated synthetic polyamide textile material of claim 10 in which said condensation product of higher molecular weight comprises components (a), (b) and (c) in a molecular ratio of 1:0.7–1.1:0.5–0.25.

12. The treated synthetic polyamide textile material of claim 11 in which component (c) is phenol sulfonic acid.

13. The treated synthetic polyamide textile material of claim 11 in which the aqueous liquors for after-treatment contain electrolyte in addition to said condensation products.

14. The treated synthetic polyamide textile material of claim 13 in which said electrolyte is an alkali metal, an alkaline earth metal or a heavy metal salt of an organic acid.

15. The treated synthetic polyamide textile material of claim 13 in which said electrolyte is a sodium or potassium chloride or a cadmium, zinc or magnesium salt of hydrochloric, sulfuric or acetic acid.

16. The treated synthetic polyamide textile material of claim 13 in which magnesium sulfate or zinc acetate is used as said electrolyte.

17. The treated synthetic polyamide textile material of claim 10 in which said condensation product of higher molecular weight is soluble in water only with heating and forms an opalescent solution.

18. The treated synthetic polyamide textile material of claim 10 in which the amount of said condensation product of higher molecular weight in the aqueous liquor is 0.5–5 percent by weight of the synthetic polyamide material and in which the aqueous liquor is applied to increase the weight of the synthetic polyamide by 70–140 percent.

* * * * *